US006935954B2

United States Patent
Sterchi et al.

(10) Patent No.: US 6,935,954 B2
(45) Date of Patent: Aug. 30, 2005

(54) SANITY SYSTEM FOR VIDEO GAME

(75) Inventors: Henry C. Sterchi, Redmond, WA (US); Edward A. Ridgeway, Redmond, WA (US); Denis P. Dyack, Ontario (CA)

(73) Assignee: Nintendo of America Inc., Redmond, WA (US)

(*) Notice: Subject to any disclaimer, the term of this patent is extended or adjusted under 35 U.S.C. 154(b) by 326 days.

(21) Appl. No.: 10/181,768

(22) PCT Filed: Dec. 14, 2000

(86) PCT No.: PCT/US00/33717
§ 371 (c)(1),
(2), (4) Date: Sep. 3, 2002

(87) PCT Pub. No.: WO01/62359
PCT Pub. Date: Aug. 30, 2001

(65) Prior Publication Data
US 2003/0207712 A1 Nov. 6, 2003

Related U.S. Application Data

(60) Provisional application No. 60/184,656, filed on Feb. 24, 2000.

(51) Int. Cl.[7] ................................................ A63F 9/24
(52) U.S. Cl. ............................................. 463/31; 463/1
(58) Field of Search ........................... 463/1–9, 23, 31, 463/32, 43; 345/473–475, 706–709, 949, 956, 957, 960

(56) References Cited

U.S. PATENT DOCUMENTS 5,393,071 A * 2/1995 Best ............................ 463/35

FOREIGN PATENT DOCUMENTS

| JP | 11076621 A | 3/1999 |
| JP | 200070550 A | 3/2000 |
| JP | 2000245968 A | 9/2000 |

OTHER PUBLICATIONS

"Vagrant Story"; Instruction Manual, Square Electronic Arts LLC, 1999, p. 8.

* cited by examiner

Primary Examiner—Mark Sager
Assistant Examiner—Steven Ashburn
(74) Attorney, Agent, or Firm—Nixon & Vanderhye P.C.

(57) ABSTRACT

A video game and game system incorporating a game character's sanity level that is affected by occurrences in the game such as encountering a game creature or gruesome situation. A character's sanity level is modified by an amount determined based on a character reaction to the occurrence such as taking a rest or slowing game progress and/or an amount of character preparation. That is, if a character is prepared for the particular occurrence, the occurrence may have little or no affect on the character's sanity level. As the character's sanity level decreases, game play is effected such as by controlling game effects, audio effects, creating hallucinations and the like. In this context. the same game can be played differently each time it is played.

21 Claims, 5 Drawing Sheets

SANITY SYSTEM FOR VIDEO GAME

This application is the U.S. national phase of International PCT Application No. PCT/US00/33717, filed Dec. 14, 2000, which designated the United States. PCT/US00/33717 claims priority of U.S. Provisional Patent Application Ser. No. 60/184,656, filed Feb. 24, 2000. The entire contents of these applications are herein incorporated by reference.

FIELD OF THE INVENTION

This invention relates to video games, and, more particularly, to a new gameplay feature for video games, such as Role Playing Games (RPGs) and the like, wherein the sanity (e.g. mental state) of the player or game character is used to enhance gameplay.

BACKGROUND OF THE INVENTION

Video games, such as RPGs and the like, typically include a game character that proceeds through the game while one or more physical conditions of the character, such as injury, strength and/or stamina, are monitored by the game. For example, such video games have monitored the level of injury that a character has sustained during gameplay by, for instance, engaging in fights with enemy characters. Such video games have also been programmed to cause the game to end as a result of the player reaching a certain threshold for one or more of the monitored physical conditions, such as level of injury. In other words, if a player's injury level rises to a predetermined level, the player may be considered by the game to have been killed during gameplay or injured to a point that the player cannot continue the game. While these and other similar features have been successful in video games, game developers continue to seek new, interesting, exciting and/or challenging features for video games. The present invention was developed in order to meet this need for new gameplay features.

SUMMARY OF THE INVENTION

The human mind is a somewhat fragile control system. When circumstances beyond imagination are encountered, the brain must attempt to deal with the improbable and impossible as reality. Sometimes it is just too much for the individual to handle. In these instances, insanity may take hold of the individual, temporarily disabling or forcing the person into a catatonic state.

The instant invention uses the concept of player "sanity" as a condition which is monitored and used during gameplay. In other words, in accordance with the instant invention, the game is programmed such that the sanity of the player or character is effected during gameplay as a result of occurrences in the game and/or by the decisions made by the player during gameplay. In addition, the level of sanity of the player is used to effect gameplay, as will be explained in greater detail below. In other words, the more insane the player becomes (i.e., the lower a player's sanity level becomes), the more the player will experience changes in the game that may affect the storyline for the game and/or hinder the player's ability to progress through the game.

As with the injury level gameplay feature described above, the game is programmed such that the sanity level will have to be considered by the player and the player will have to take preventive steps or actions in the game to ensure the player's survival during the game.

In an exemplary embodiment of the invention, a method of operating a video game including a game character controlled by a player includes (a) setting a sanity level of the game character, (b) modifying the sanity level of the game character during game play according to occurrences in the game, wherein a modifying amount is determined based on a character reaction and an amount of character preparation, and (c) controlling game play according to the sanity level of the game character. Step (b) may be practiced by reducing the sanity level of the game character upon encountering a game creature or a gruesome situation. In this context, the modifying amount is reduced if the game character has been prepared for the respective game creature or gruesome situation. Alternatively or additionally, the modifying amount may be reduced if the game character is rested after encountering the respective game creature or gruesome situation. Step (b) may be practiced by increasing the sanity level of the game character if the game character locates a mind aid during game play.

Step (c) may be practiced by detrimentally affecting game character reactions to player commands with decreasing sanity. Step (c) may also be practiced by causing the game character to hallucinate with decreasing sanity. Markers may be provided that draw the game character's attention during game play, wherein the markers are subjected to different effects corresponding to the sanity level of the game character. Game effects such as audio effects and the like may be varied according to the sanity level of the game character. Preferably, a sanity meter is displayed that displays the sanity level of the game character during game play.

In another exemplary embodiment of the invention, a video game system includes a control processor for playing a video game including a game character controlled by a player. A setting unit communicates with the control processor and sets a sanity level of the game character. The sanity level of the game character is modified during game play according to occurrences in the game, wherein a modifying amount is determined based on character reaction and an amount of character preparation. The control processor controls game according to the sanity level of the game character.

BRIEF DESCRIPTION OF THE DRAWINGS

These and other aspects and advantages of the present invention will be described in detail with reference to the accompanying drawings, in which.

DETAILED DESCRIPTION OF PREFERRED EMBODIMENTS

Figure 3:
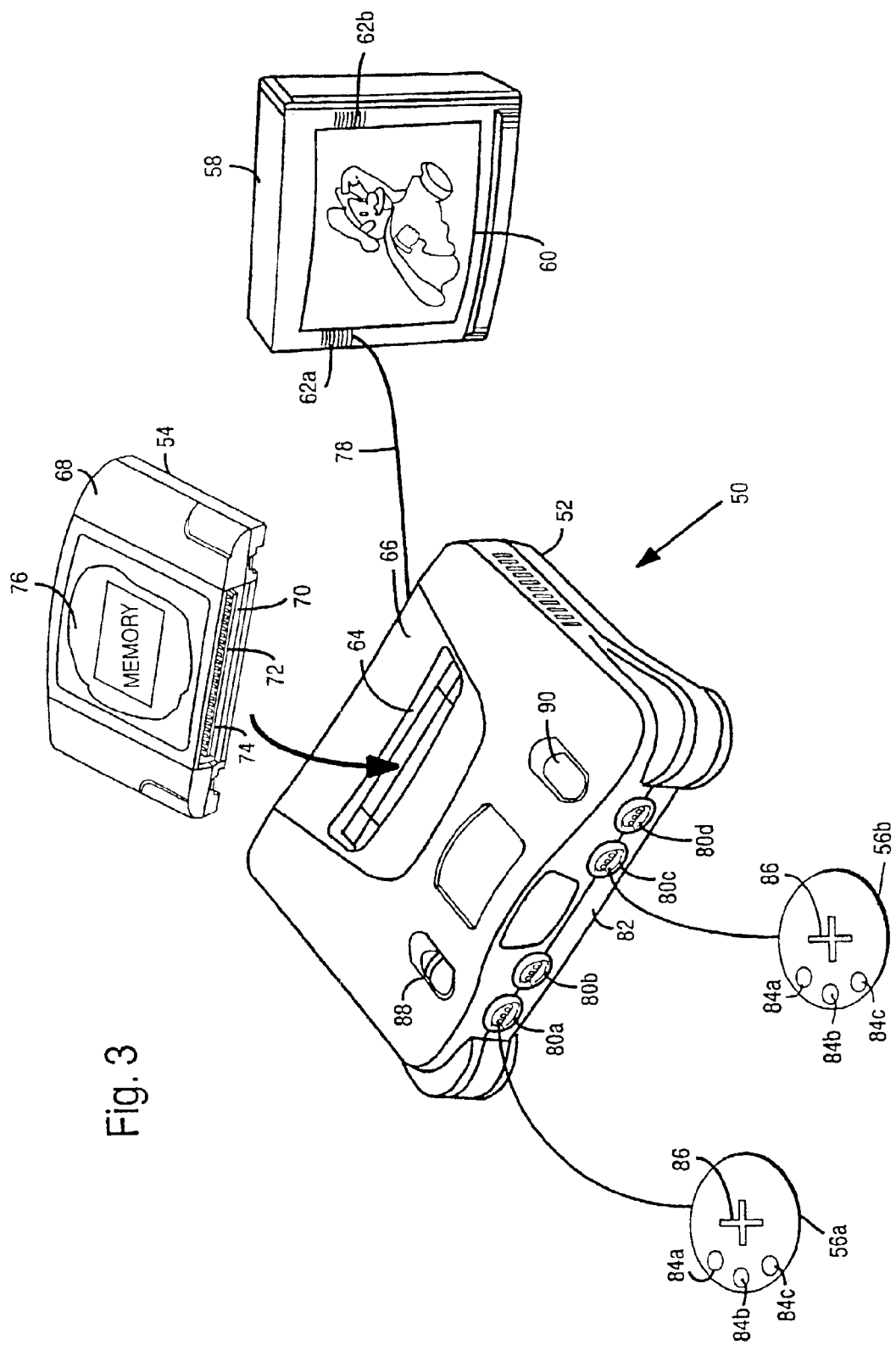
FIG. 3 shows a game console system.

FIG. 3 shows a game console system 50 that constitutes a suitable game machine for playing games incorporating the sanity feature of the present invention. The video game system 50 includes a main console 52, a video game storage device 54, and handheld controllers 56a and 56b (or other user input devices). Video game system 50 may be, for example, the Nintendo 64® video game system. Main console 52 is connected to a conventional home color television set 58. Television set 58 displays three-dimensional (3-D) video game images on its television screen 60 and reproduces stereo sound through its speakers 62a and 62b.

Video game storage device 54 is typically in the form of a replaceable memory cartridge insertable into a slot 64 on a top surface 66 of console 52. A wide variety of alternative program storage media such as CD ROMs, DVDs, floppy disks, and the like may be utilized. Video game storage device 54 may, for example, comprise a plastic housing 68 encasing a printed circuit board 70. Printed circuit board 70 has an edge 72 defining a number of electrical contacts 74. When the video game storage device 54 is inserted into main console slot 64, the cartridge electrical contacts 74 mate with corresponding "edge connector" electrical contacts within the main console. This action electrically connects the storage device printed circuit board 70 to the electronics within main console 52. At least a memory 76 is disposed on printed circuit board 70 within storage device housing 68. Memory 76 includes a read only memory (ROM) and possibly a read/write memory (e.g., an EEPROM). The ROM stores instructions and other information pertaining to a particular video game. The ROM of a memory 76 for one game cartridge storage device 54 may, for example, contain instructions and other information for an adventure game while the ROM of a memory 76 of another storage device 54 may contain instructions and information to play a car race game, an educational game, etc. To play one game as opposed to another game, the user of video game system 50 need only plug the appropriate storage device 54 into main console slot 64—thereby connecting the storage device's memory 76 (and any other circuitry it may contain) to console 52. This enables a computer system embodied within console 52 to access the information contained within the ROM of memory 76, which information controls the console computer system to play the appropriate video game by displaying images and reproducing sound on color television set 58 as specified under control of the ROM game program information.

Data may be written to and read from a read/write memory of memory 76 by the computer system embodied within console 52. This data may include, but is not limited to, game scores and game levels.

The user may connect up to four controllers to corresponding connectors (sockets) 80a–80d on main unit front panel 82. Two controllers 56a and 56b are shown in FIG. 3. Controllers 56a and 56b may take a variety of forms. For example, each of controllers 56a and 56b shown in FIG. 3 include various function controlling push buttons such as 84a–c and an X-Y switch 86 used, for example, to specify the direction (up, down, left or right) that a player-controllable character displayed on television screen 60 should move. Other controller possibilities include joysticks, nice pointer controls and a wide range of other conventional user input devices.

In use, a user selects a storage device 54 containing a desired video game, and inserts that storage device into console slot 64 (thereby electrically connecting memory 76 and other cartridge electronics to the main console electronics). The user then operates a power switch 88 to turn on the video game system 50 and operates controllers 56a and/or 56b to provide inputs to console 52 and thus control video game play. For example, depressing one of push buttons 84a–c may cause the game to start playing. Moving directional switch 86 may cause animated characters to move on the television screen 60 in controllably different directions. Depending upon the particular video game stored within the storage device 54, these various controls 84a–c and 86 on the controllers 56a and 56b can perform different functions at different times. If the user wants to restart game play from the beginning, or alternatively with certain game programs reset the game to a known continuation point, the user can press a reset button 90.

Additional details of game system 50 may be found in U.S. Pat. No. 6,022,274 the contents of which are incorporated herein by reference.

Certain of the above-described system components could be implemented as other than the home video game console configuration described above. For example, one could run graphics application or other software written for system 50 on a platform with a different configuration that emulates system 50 or is otherwise compatible with it. If the other platform can successfully emulate, simulate and/or provide some or all of the hardware and software resources of system 50, then the other platform will be able to successfully execute the software.

As one example, an emulator may provide a hardware and/or software configuration (platform) that is different from the hardware and/or software configuration (platform) of system 50. The emulator system might include software and/or hardware components that emulate or simulate some or all of hardware and/or software components of the system for which the application software was written. For example, the emulator system could comprise a general-purpose digital computer such as a personal computer, which executes a software emulator program that simulates the hardware and/or firmware of system 50. The DSP processing of the above-described audio system could be emulated on a personal computer.

Some general purpose digital computers (e.g., IBM or MacIntosh personal computers and compatibles) are now equipped with 3D graphics cards that provide 3D graphics pipelines compliant with DirectX or other standard 3D graphics command APIs. They may also be equipped with stereophonic sound cards that provide high quality stereophonic sound based on a standard set of sound commands. Such multimedia-hardware-equipped personal computers running emulator software may have sufficient performance to approximate the graphics and sound performance of system 50. Emulator software controls the hardware resources on the personal computer platform to simulate the processing, 3D graphics, sound, peripheral and other capabilities of the home video game console platform for which the game programmer wrote the game software.

Figure 4A:
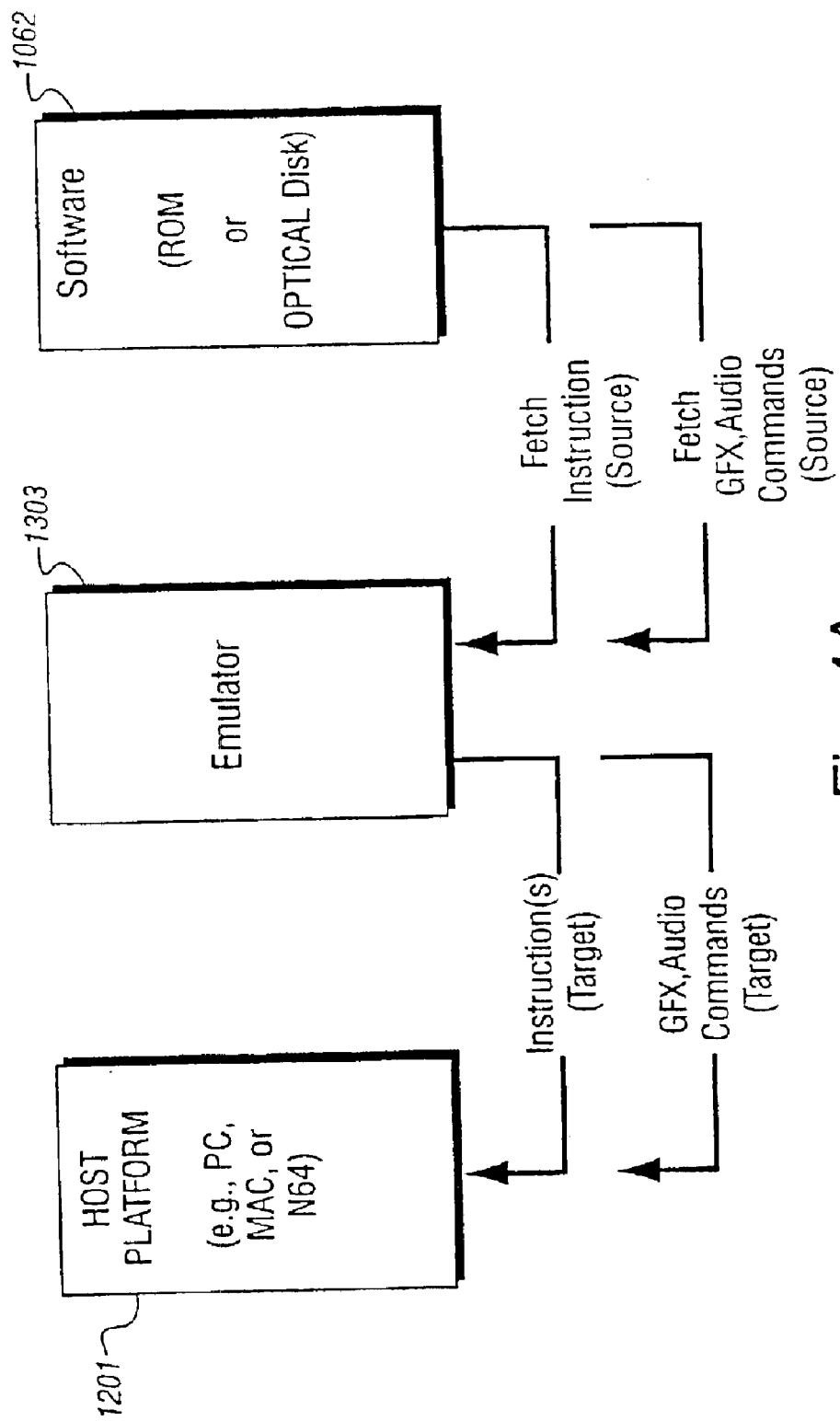
FIGS. 4A and 4B illustrate an emulation process and an emulation host system.

FIG. 4A illustrates an example overall emulation process using a host platform 1201, an emulator component 1303, and a game software executable binary image provided on a storage medium 1062. Host 1201 may be a general or special purpose digital computing device such as, for example, a personal computer, a video game console, or any other platform with sufficient computing power. Emulator 1303 may be software and/or hardware that runs on host platform 1201, and provides a real-time conversion of commands, data and other information from storage medium 1062 into a form that can be processed by host 1201. For example, emulator 1303 fetches "source" binary-image program instructions intended for execution by system 50 from storage medium 1062 and converts these program instructions to a target format that can be executed or otherwise processed by host 1201.

As one example, in the case where the software is written for execution on a platform using an IBM PowerPC or other specific processor and the host 1201 is a personal computer using a different (e.g., Intel) processor, emulator 1303 fetches one or a sequence of binary-image program instructions from storage medium 1062 and converts these program instructions to one or more equivalent Intel binary-image program instructions. The emulator 1303 also fetches and/or generates graphics commands and audio commands intended for processing by a graphics and audio processor, and converts these commands into a format or formats that can be processed by hardware and/or software graphics and audio processing resources available on host 1201. As one example, emulator 1303 may convert these commands into commands that can be processed by specific graphics and/or or sound hardware of the host 1201 (e.g., using standard DirectX, OpenGL and/or sound APIs).

The emulator 1303 used to provide some or all of the features of the video game system described above may also be provided with a graphic user interface (GUI) that simplifies or automates the selection of various options and screen modes for games run using the emulator. In one example, the emulator 1303 may further include enhanced functionality as compared with the host platform for which the software was originally intended.

Figure 4B:
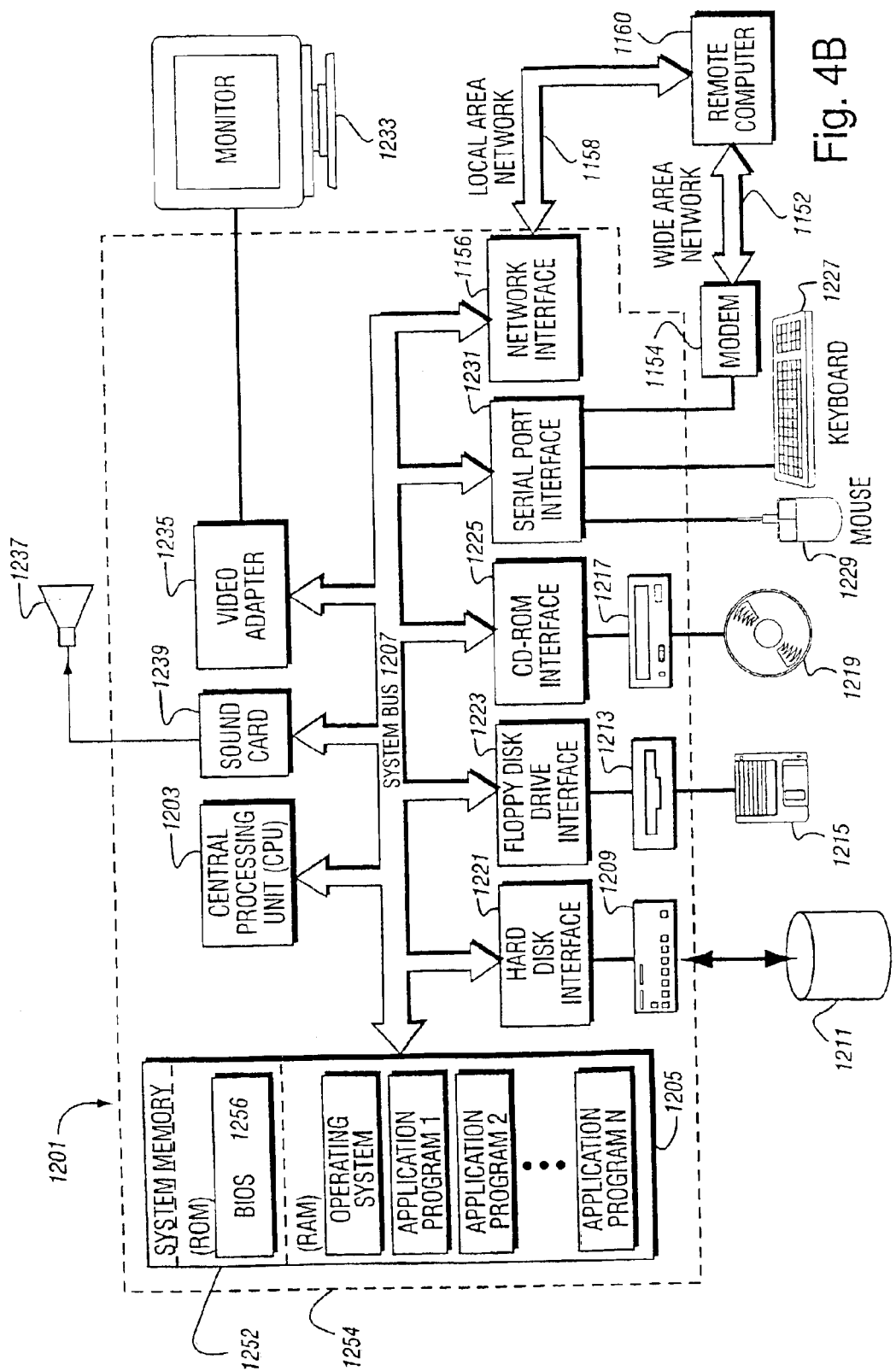

FIG. 4B illustrates an emulation host system 1201 suitable for use with emulator 1303. System 1201 includes a processing unit 1203 and a system memory 1205. A system bus 1207 couples various system components including system memory 1205 to processing unit 1203. System bus 1207 may be any of several types of bus structures including a memory bus or memory controller, a peripheral bus, and a local bus using any of a variety of bus architectures. System memory 1207 includes read only memory (ROM) 1252 and random access memory (RAM) 1254. A basic input/output system (BIOS) 1256, containing the basic routines that help to transfer information between elements within personal computer system 1201, such as during start-up, is stored in the ROM 1252. System 1201 further includes various drives and associated computer-readable media. A hard disk drive 1209 reads from and writes to a (typically fixed) magnetic hard disk 1211. An additional (possible optional) magnetic disk drive 1213 reads from and writes to a removable "floppy" or other magnetic disk 1215. An optical disk drive 1217 reads from and, in some configurations, writes to a removable optical disk 1219 such as a CD ROM or other optical media. Hard disk drive 1209 and optical disk drive 1217 are connected to system bus 1207 by a hard disk drive interface 1221 and an optical drive interface 1225, respectively. The drives and their associated computer-readable media provide nonvolatile storage of computer-readable instructions, data structures, program modules, game programs and other data for personal computer system 1201. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program modules including emulator 1303 may be stored on the hard disk 1211, removable magnetic disk 1215, optical disk 1219 and/or the ROM 1252 and/or the RAM 1254 of system memory 1205. Such program modules may include an operating system providing graphics and sound APIs, one or more application programs, other program modules, program data and game data. A user may enter commands and information into personal computer system 1201 through input devices such as a keyboard 1227, pointing device 1229, microphones, joysticks, game controllers, satellite dishes, scanners, or the like. These and other input devices can be connected to processing unit 1203 through a serial port interface 1231 that is coupled to system bus 1207, but may be connected by other interfaces, such as a parallel port, game port Fire wire bus or a universal serial bus (USB). A monitor 1233 or other type of display device is also connected to system bus 1207 via an interface, such as a video adapter 1235.

System 1201 may also include a modem 1154 or other network interface means for establishing communications over a network 1152 such as the Internet. Modem 1154, which may be internal or external, is connected to system bus 123 via serial port interface 1231. A network interface 1156 may also be provided for allowing system 1201 to communicate with a remote computing device 1150 (e.g., another system 1201) via a local area network 1158 (or such communication may be via wide area network 1152 or other communications path such as dial-up or other communications means). System 1201 will typically include other peripheral output devices, such as printers and other standard peripheral devices.

In one example, video adapter 1235 may include a 3D graphics pipeline chip set providing fast 3D graphics rendering in response to 3D graphics commands issued based on a standard 3D graphics application programmer interface such as Microsoft's DirectX 7.0 or other version. A set of stereo loudspeakers 1237 is also connected to system bus 1207 via a sound generating interface such as a conventional "sound card" providing hardware and embedded software support for generating high quality stereophonic sound based on sound commands provided by bus 1207. These hardware capabilities allow system 1201 to provide sufficient graphics and sound speed performance to play software stored in storage medium 1205.

Figure 1:
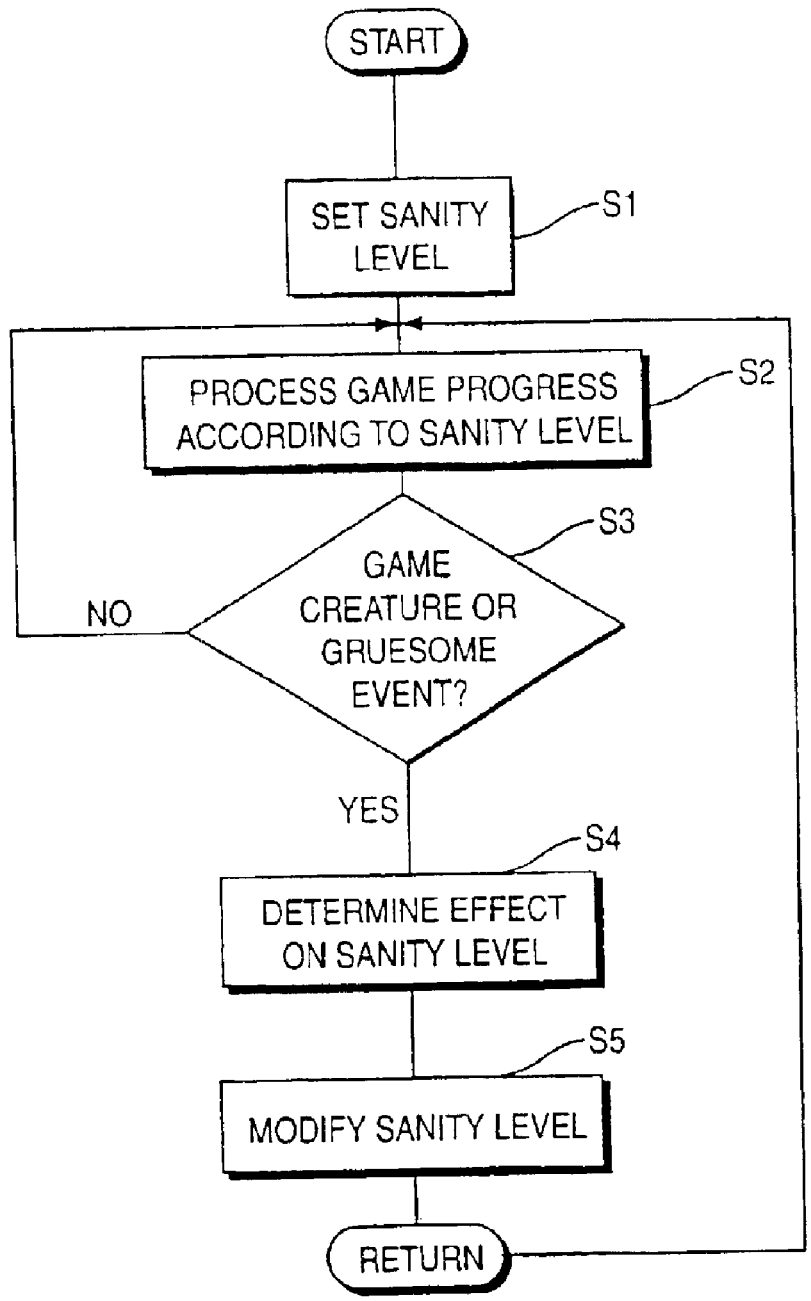
FIG. 1 is a flow chart showing a method of the present invention.
Figure 2:
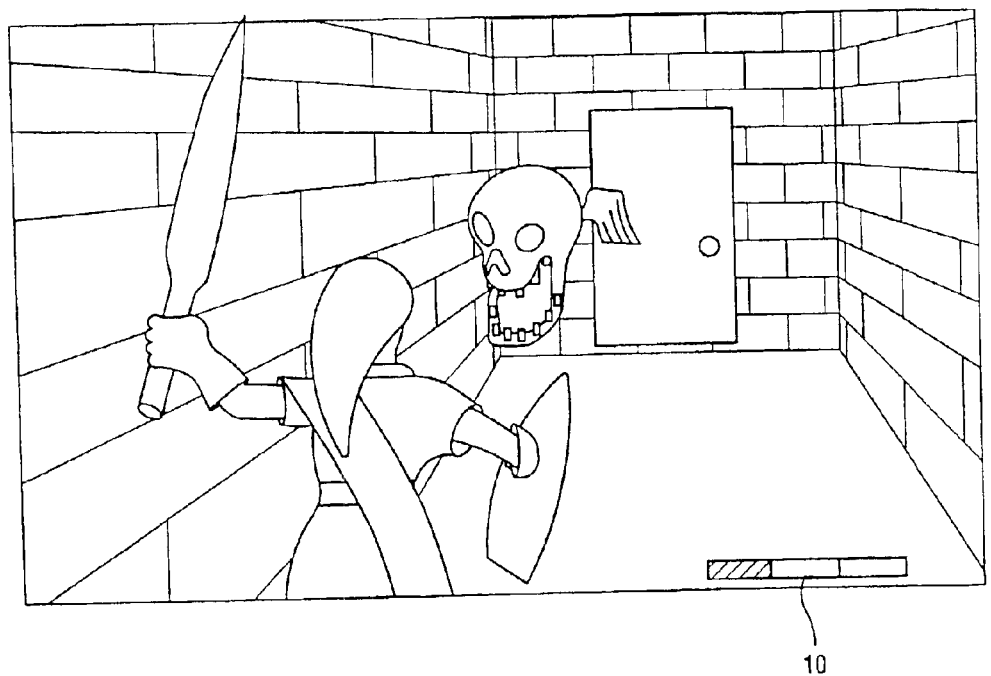
FIG. 2 is an exemplary screen shot of a video game including a sanity meter.

During video game play, a game character may be exposed to many horrific scenes such as one or more game creatures or a gruesome situation that affect a game character's sanity. Referring to FIG. 1, in accordance with a preferred embodiment of the invention, at the start of a level, the game character will have a set amount of sanity (step S1), which can be visually represented by a bar graph or percentage as shown at 10 in FIG. 2. In step S2, the game progresses according to the game character's sanity level. In this context, as the game character's sanity level decreases, the game character becomes less sane and more susceptible to game effects as further discussed below. As the player encounters a creature or a gruesome situation (step S3), the system determines an affect on sanity level in step S4, and the game character's sanity level is modified in step S5.

For example, a predetermined or relevant amount of sanity may be temporarily lost. The system then returns the process to step S2 to continue with the game. When a situation occurs that detrimentally affects the game character's sanity level, if the player presses on without resting or without the proper preparation, he or she may lose all sanity, which affect is determined in step S4. If the player goes insane, the player will have to deal with the repercussions of their condition. The effects could range from something as simple as being stunned temporarily all the way to extreme shell shock. However, both of these conditions under desperate situations could spell certain doom for the player.

In accordance with the invention, generally the character's sanity is more of an atmospheric element, and the character animation will change showing the progressive states of uneasiness experienced by the character as it loses sanity. Pacing oneself through the carnage of the game is one of many possible methods that can be used to keep the character sane during gameplay.

In accordance with the invention, another method to help the character's mental state is research and knowledge. In other words, if the character knows exactly what is to be faced, the effect on the character's sanity may be reduced. In this context, the game may include a practice area with game creatures the same as or similar to those to be encountered during game play. Practicing against such creatures will reduce the affect on the character's sanity when the same or similar character is encountered during game play. The game program may also provide mind aids including, for example, items such as herbs, elixirs, medallions, Magicks, etc. that can aid the mind of the player against the darkest evil and reduce the sanity loss.

Preferably, levels of insanity will be sliding scale. The more severe the insanity (i.e., the lower the character's sanity level), the more player's control animation and targeting system will be affected. In addition, the more extreme the insanity the more hallucinations the character will experience. There may be a certain number, such as three, distinct levels of sanity loss.

The game designers incorporating this sanity feature may layout points of interest by way of markers. These markers will allow the game to cause the character to, for example, focus on strange and eerie parts of the game while insane. Such sanity markers will cause the player to look at specific areas and receive different effects corresponding to the current sanity level.

The targeting system may also be affected when the character is insane. For example, the game may be programmed to cause the character to arbitrarily lock onto non-targets to cause confusion and build on player anxiety. The character may be caused to lock onto markers in its forward and peripheral vision areas. In particular, the character may automatically lock onto and shoot out a light source (like a candle or lantern) to cause adhoc havoc in the gameplay as a result of the current level of sanity for the character.

As noted, the character may experience hallucinations as a result of the sanity level. Hallucinations may occur in the following exemplary forms:

Wall carvings coming to life and reaching out for the character

Something in wall or under floor moving by the character (Frighteners type of thing)

Statue watching the character (Head tracking)

Suit of armor moving (Relaxed to on guard stance)

Static statue or object that appears to follow the character when they're not looking False doors that appear and disappear when the attempt to open is made Glowing eyes blinking in the darkness, yet when the area is illuminated they disappear Painting that shifts and changes along with its meaning Points of interest markers that the character's head will watch In addition to the visual effects, the game may also be programmed to cause audio effects as a result of the current level of sanity of the character. For example, the character and thus the player may experience the following audio effects:

Ambient environmental sounds that get amplified or distorted

Heartbeat of character increases (May also be synchronized with Rumble Pak, a product offered by Nintendo)

Wind

Lightening

Cavern/damp-dripping sewer sound

Creatures sounds

Footsteps

Earth rumbles (e.g. great beast foot steps, may also be synchronized with Rumble Pak and camera shake)

Loud noises coming from beyond a doorway, but when opened there is only silence

Whispering sounds coming from random locations that fade in and out

In addition to the visual and audio effects described above, the game may also be programmed to cause miscellaneous effects as a result of the sanity level, such as:

Hallucination: lights go out, and a creature appears as lights come on, then the lights go back off, then the light comes back on and the creature is gone Stretching walls and corridors so they require more time to traverse Bleeding walls Enormous roar that emits from a tiny rodent (Mouse or rat)

Dripping water from above, but when the character takes a second look it is now blood Shadows that appear to shift and change Character's torch mysteriously blows out, loud noise then it is once again lit Faint maniacal laughter (That gets louder and louder as the character draws deeper into insanity)

Ambient audio, such as a water drip could become louder as insanity increases, so a really insane character will occasionally have this irritating dripping sound to distract him Lagging shadow (the character's shadow appears to follow the character)

In accordance with the instant invention, the sanity feature can be programmed into any suitable video game using known programming techniques for the purpose of enhancing gameplay. As explained above, the sanity of the player's character will be affected by decisions made, enemies faced, as well as any other suitable occurrence that may relate to sanity. As the character loses sanity, the environment will change in a way that hinders the character's and player's progress through the game. The instant invention provides an added challenge and enables multiple possible scenarios, so that playing of the game may be different each time the game is played. It is noted that the invention is particularly suited for implementation in action/adventure/RPG games, but that it may be used in any suitable video game or the like.

While preferred embodiments of the instant invention have been described herein, it is noted that various changes and modification may be made, as one skilled in the art will readily understand from the description of the invention herein. Thus, the description of the invention herein is not meant to be limiting to the true scope of the invention.

What is claimed is:

1. A method of operating a video game including a game character controlled by a player, the method comprising:

(a) setting a sanity level of the game character;

(b) modifying the sanity level of the game, character during game play according to occurrences in the game, wherein a modifying amount of is determined based on a charater reaction and an amount of character preparation; and (c) controlling game play according to the sanity level of the game character, game play being controlled at least by varying game effects according to the game charater sanity level.

2. A method according to claim 1, wherein step (b) is practiced by reducing the sanity level of the game character upon encoutering a game creature or a gruesome situation.

3. A method according to claim 2, wherein the modifying amount is reduced if the game character has been prepared for the respective game creature or a gruesome situation.

4. A method according to claim 2, wherein the modifying amount is reduced if the game character is rested after encountering the respective game creature or gruesome situation.

5. A method according to claim 1, wherein step (b) is practiced by increasing the sanity level of the game character if the game character locates a mind aid during game play.

6. A method according to claim 1, wherein step (c) is practiced by detrimentally affecting game character reactions to player commands with decreasing sanity.

7. A method according to claim 1, wherein step (c) is practiced by causing the game character to hallucinate with decreasing sanity.

8. A method according to claim 7, wherein step (c) is further practiced by providing markers that draw the game character's attention during game play, and by subjecting the markers to different effects corresponding to the sanity level of the game character.

9. A method according to claim 1, wherein step (c) is practiced by varying game audio effects according to the sanity level of the game character.

10. A method according to claim 1, further comprising displaying a sanity meter that displays the sanity level of the game character.

11. A video game system including a control processor for playing a video game including a game character controlled by a player, the video game system comprising a setting unit communicating with the control processor that sets a sanity level of the game character, wherein the sanity level of the game character is modified during game play according to occurrences in the game, and wherein a modifying amount is determined based on a character reaction and an amount of character preparation, the control processor controlling game play according to the sanity level of the game character, wherein game play is controlled at least by varying game effects according to the game character sanity level.

12. A video game according to claim 11, wherein the sanity level of the game character is reduced upon encountering a game creature or a gruesome situation.

13. A video game according to claim 12, wherein the modifying amount is reduced if the game character has been prepared for the respective game creature or gruesome situation.

14. A video game according to claim 12, wherein the modifying amount is reduced if the game character is rested after encountering the respective game creature or gruesome situation.

15. A video game according to claim 11, wherein the sanity level of the game character is increased if the game character locates a mind aid during game play.

16. A video game according to claim 11, wherein game character reactions to player commands are detrimentally affected with decreasing sanity.

17. A video game according to claim 11, wherein the game character is caused to hallucinate with decreasing sanity.

18. A video game according to claim 17, wherein markers are provided that draw the game character's attention during game play, and wherein the markers are subjected to different effects corresponding to the sanity level of the game character.

19. A video game according to claim 11, wherein game audio effects are varied according to the sanity level of the game character.

20. A video game according to claim 12, further comprising a sanity meter that displays the sanity level of the game character.

21. A video game system including a control processor for playing a video game including a game character controlled by a player, the video game system comprising
    means for setting a sanity level of the game character;
    means for modifying the sanity level of the game character during game play according to occurrences in the game, wherein a modifying amount is determined based on a character reaction and an amount of character preparation; and
    means for controlling game play according to the sanity level of the game character, game play being controlled at least by varying game effects according to the game character sanity level.

* * * * *